Patented Apr. 17, 1951

2,548,898

UNITED STATES PATENT OFFICE 2,548,898

QUATERNARY THENYL COMPOUNDS

Lucas P. Kyrides, St. Louis, Mo., assignor to Monsanto Chemical Company, St. Louis, Mo., a corporation of Delaware No Drawing. Application November 16, 1945, Serial No. 629,193

9 Claims. (Cl. 260—329)

This invention relates to quaternary compounds and in particular to certain novel quaternary halides containing as a substituent the thenyl residue.

I have found that novel quaternary compounds can be obtained by reacting dimethylamine with cetyl chloride to form cetyl dimethylamine, and subsequently reacting this compound with thenyl chloride to form cetyl-dimethyl-2-thenyl ammonium chloride. As an alternative procedure, I may also react dimethylamine with thenyl chloride to form dimethyl-thenyl-amine. This compound is then reacted with cetyl chloride or cetyl bromide to produce respectively cetyl-dimethyl-2-thenyl ammonium chloride and cetyl-dimethyl-2-thenyl ammonium bromide. The novel compounds of the present invention have been found to be effective against the micro-organisms Staphylococcus aureus and Eberthella typhosa. The compounds were found to be superior to benzyl-dimethyl-cetyl ammonium chloride (Zephiran) when tested against Staphylococcus aureus.

In place of dimethylamine in the above process, other dialkylamines having from 1 to 7 carbon atoms in the alkyl radicals may be employed, for example methyl-ethyl-amine, diethylamine, dipropylamine or di-n-butylamine. The resulting compounds, which are effective against microorganisms, are cetyl-methyl-ethyl-2-thenyl ammonium chloride, cetyl-methyl ethyl-2-thenyl ammonium bromide, cetyl-diethyl-2-thenyl ammonium chloride, cetyl-diethyl-2-thenyl ammonium bromide, cetyl-dipropyl-2-thenyl ammonium chloride, cetyl-dipropyl-2-thenyl ammonium bromide, cetyl-di-n-butyl-2-thenyl ammonium chloride and cetyl-di-n-butyl-2-thenyl ammonium bromide. In place of a mixed dialkylamine in the above process, a mixed alkyl and aryl-methyl or cycloalkylmethylamine may be employed, for example methyl-benzyl-amine, methyl-o-tolylmethyl amine or methyl-2-thenyl amine or methyl-cyclohexylmethyl amine, methyl-cycloprophylmethyl amine or methyl-cyclobutylmethyl amine. Illustrative of the resulting compounds by the process of the present invention are cetyl-benzyl-methyl-2-thenyl ammonium chloride, cetyl-heptyl-n-butyl-2-thenyl ammonium chloride, cetyl-methyl-di-(2-thenyl) ammonium chloride, cetyl-ethyl-cyclohexylmethyl-2-thenyl ammonium chloride and cetyl-methyl-ethyl-2-thenyl ammonium chloride.

The compounds of the present invention may be employed as germicides in any desired manner, for example, the compounds may be dissolved in a suitable solvent such as water or an organic solvent, either alone or together with other components. The concentration of the compound in the solution thus prepared may vary over a wide range, from a few parts of the compound per fifty thousand parts of the solvent to 5% or more of the compound. The concentration of the solution depends entirely upon the particular use for which the germicidal composition is intended.

Likewise, in place of cetyl chloride or cetyl bromide, a long chain alkyl halide having from 8 to 18 carbon atoms may be employed, for example decyl chloride, dodecyl chloride tetradecyl bromide, tetradecyl iodide, pentadecyl bromide, pentadecyl fluoride, heptadecyl chloride, and octadecyl chloride. Illustrative of the resulting compounds, which are effective against microorganisms, are decyl-di-n-butyl-2-thenyl ammonium chloride, tetradecyl-dipropyl-2-thenyl ammonium iodide, pentadecyl-diethyl-2-thenyl ammonium fluoride and octadecyl-dimethyl-2-thenyl ammonium chloride. Moreover, in place of thenyl chloride, alkylated thenyl chlorides may be employed, for example 5-methyl-2-thenyl chloride. Illustrative of the resulting compounds are cetyl-dimethyl-2-(5'-methyl)-thenyl ammonium chloride and cetyl-diethyl-2-(5'-methyl)-thenyl ammonium bromide.

A particularly useful product for general germicide purposes, such as in floor cleaning compositions, may be prepared by using in place of cetyl chloride in the process of the present invention a mixture of alkyl halides derived by converting into the corresponding alkyl halides a technical mixture of monohydric alcohols containing from 8 to 18 carbon atoms. This mixture of alcohols is available on a commercial scale and constitutes an economical and readily available source of starting materials.

The compounds of the present invention may be identified as having the following structure:

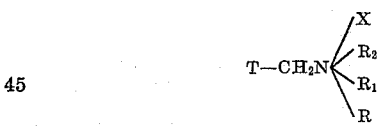

in which T is a radical having thiophene as a nucleus, R is a straight chain alkyl radical containing 8 to 18 carbon atoms, $R_1$ is a radical selected from the group consisting of alkyl radicals containing 1 to 7 carbon atoms, cycloalkyl-methyl radicals, aryl-methyl radicals and thienyl-methyl radicals, $R_2$ is an alkyl radical containing 1 to 7 carbon atoms, and X is a halogen.

Any desired procedure may be employed in preparing the tertiary amines for subsequent reaction with an aliphatic halide or with thenyl chloride to produce the novel quaternary compounds of the present invention. For example, a lower dialkyl amine or mixed alkyl amine may be reacted with an aliphatic halide containing 8 to 18 carbon atoms. As an alternative, a mono-alkyl amine containing 8 to 18 carbon atoms may be reacted with an alkyl halide containing 1 to 7 carbon atoms. The secondary amine resulting therefrom may be recovered and reacted with an additional portion of alkyl halide or with a halide selected from the group consisting of cycloalkyl-methyl, aryl-methyl or thenyl-methyl halides. As a further alternative a tertiary amine containing a thenyl radical, a long chain alkyl radical and a short chain alkyl radical may be reacted with a short chain alkyl halide to produce the quaternary compound. Any desired sequence of operations may be employed in preparing the tertiary amine and the novel quaternary compounds of the present invention.

The following examples illustrate the preparation of the novel compounds of the present invention. These examples are to be construed merely as illustrative and not as limiting the invention.

*Example I*

An aqueous solution of dimethylamine was heated and the vapors of dimethylamine were passed into 150 cc. of cold butanol until there was an increase in weight of 66.2 g. (1.47 moles). The resulting solution of dimethylamine was mixed with 130.5 g. (0.5 mole) of cetyl chloride and heated in an autoclave equipped with an agitator at a temperature of approximately 150° C. and a pressure varying from 110–180 pounds per square inch for a period of approximately 3½ hours. The contents of the autoclave were then refluxed for one hour with 42 g. of 50% caustic soda in 100 cc. of water. Thereafter the mixture was cooled and filtered. The filtrate separated into two layers. The layers were separated and washed and the butanol layer was distilled. There was obtained 123 g. (91.5% yield) of cetyl-dimethylamine, B. P. 135–136° C./2 mm. This material was subsequently distilled to produce cetyl-dimethylamine assaying at 96.9%. To a solution of 28 g. (0.1 mole) of 96.9% cetyl-dimethylamine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The crystals which formed were filtered off and dried. Yield 38.1 g. (98.2%) of cetyl-dimethyl-2-thenyl ammonium chloride. The product was recrystallized from 200 cc. of acetone and was dried in vacuo under full water vacuum at 55–60° C. for 8 hours. There was obtained 36.7 g. of material melting at 75–77° C. The product may be further purified by recrystallization from iso-propanol solution to which ether is added or from benzene or acetone. Any suitable combination of these solvents may be used to effect a series of recrystallizations if desired.

*Example II*

A solution of 55 g. of anhydrous dimethylamine was dissolved in 100 cc. of cold methanol. The solution was charged into a cold 500 cc. autoclave and 70.2 g. of cold 2-thenyl chloride was added. The mixture was heated with agitation in a water bath at boiling temperature. The reaction product was freed from methanol, dissolved in benzene and the benzene solution was rendered alkaline with caustic soda. The resulting material, dimethyl-2-thenyl amine, was washed with water and fractionally distilled. Thirty-three grams of dimethyl-2-thenyl amine was mixed with 70 g. of cetyl bromide. To the reaction mixture was added approximately 20 cc. of xylene. The mixture was heated with agitation at 125–130° C. for 26 hours. The liquid reaction product was cooled and treated with acetone. Upon cooling further, crystals separated from the solution. The crystals were filtered off, washed with cold acetone and redissolved in hot acetone and the resulting solution was agitated while hot with activated carbon and subsequently filtered hot. The clear filtrate was cooled slowly to the temperature of ice water. The material which separated from the solution was filtered off and washed several times with cold acetone. The washed material was dried overnight in an oven. Good yields of cetyl-dimethyl-2-thenyl ammonium bromide were obtained.

*Example III*

Cetyl-diethylamine is prepared by any desired procedure, for example by reacting cetyl chloride with diethylamine, using the procedure described in Example I. To a solution of 29.7 g. (0.1 mole) of cetyl-diethylamine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of cetyl-diethyl-2-thenyl ammonium chloride was obtained. The product may be purified according to the procedure described in Example I.

*Example IV*

Cetyl-dipropylamine is prepared by any desired procedure, for example, by reacting cetyl chloride with dipropylamine, using the procedure described in Example I. To a solution of 32.5 g. (0.1 mole) of cetyl-dipropylamine in 25 cc. of acetone was slowly added 13.3 g. (0.1 mole) of 2-thenyl chloride under reflux conditions. The solution was refluxed for 8 hours. Following this 100 cc. of acetone were added, the solution treated with charcoal, filtered hot and allowed to cool slowly. The material which separated from the solution upon cooling was filtered off and dried. A good yield of cetyl-dipropyl-2-thenyl ammonium chloride was obtained. The product may be purified according to the procedure of Example I.

*Example V*

Cetyl-di-n-butylamine is prepared by any desired procedure, for example by reacting cetyl chloride and di-n-butylamine using the procedure described in Example I. To a solution of 35.3 g. (0.1 mole) of cetyl-di-n-butylamine in 25 cc. of acetone was slowly added 13.3 g. (0.1 mole) of thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of cetyl-di-n-butyl-2-thenyl ammonium chloride was obtained. The product may be purified according to the procedure of Example I.

Example VI

Decyl-di-n-butylamine is prepared by any desired procedure, for example by reacting di-n-butylamine and decyl chloride using the procedure described in Example I. To a solution of 26.9 g. (0.1 mole) of decyl-di-n-butylamine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of decyl-di-n-butyl-2-thenyl ammonium chloride was obtained. The product may be purified according to the procedure of Example I.

Example VII

A mixture of 149 g. (1.47 moles) of dipropylamine and 137.7 g. (0.5 mole) of tetradecyl bromide in 150 cc. of butanol was prepared and heated in an autoclave according to the procedure described in Example I. The contents of the autoclave were then refluxed for one hour with 42 g. of 50% caustic soda in 100 cc. of water. Thereafter the mixture was cooled and filtered. The filtrate separated into two layers. The layers were separated and washed and the butanol layer was distilled to recover tetradecyl-dipropylamine. To a solution of 29.7 g. (0.5 mole) of tetradecyl-dipropylamine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of tetradecyl-dipropyl-2-thenyl ammonium chloride was obtained. The product may be purified according to the procedure of Example I.

Example VIII

A mixture of 107.8 g. (1.47 moles) of diethylamine and 145.7 g. (0.5 mole) of pentadecyl bromide in 150 cc. of butanol was prepared and heated in an autoclave according to the procedure described in Example I. The contents of the autoclave were then refluxed for one hour with 42 g. of 50% caustic soda in 100 cc. of water. Thereafter the mixture was cooled and filtered. The filtrate separated into two layers. The layers were separated and washed and the butanol layer was distilled to recover pentadecyl-diethylamine. To a solution of 28.3 g. (0.1 mole) of pentadecyl-diethylamine in 25 cc. of acetone was slowly added 13.3 g. (0.1 mole) of 2-thenyl chloride under reflux conditions. The solution was refluxed for 8 hours. Following this 100 cc. of acetone were added. The solution was treated with charcoal, filtered hot and allowed to cool slowly. The material which separated from the solution upon cooling was filtered off and dried. A good yield of pentadecyl-diethyl-2-thenyl ammonium chloride was obtained. The product may be purified according to the procedure of Example I.

Example IX

A mixture of 66.2 g. (1.47 moles) of dimethylamine and 144.5 g. (0.4 mole) of octadecyl chloride in 150 cc. of butanol was prepared and heated in an autoclave according to the procedure described in Example I. The contents of the autoclave were then refluxed for one hour with 42 g. of 50% caustic soda in 100 cc. of water. Thereafter the mixture was cooled and filtered. The filtrate separated into two layers. The layers were separated and washed and the butanol layer was distilled to recover octadecyl-dimethylamine. To a solution of 29.7 g. (0.1 mole) of octadecyl-dimethylamine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of octadecyl-dimethyl-2-thenyl ammonium chloride was obtained. The product may be purified according to the procedure of Example I.

Example X

A solution of 158 g. of anhydrous di-n-butylamine was dissolved in 100 cc. of cold methanol and 70.2 g. of cold 2-thenyl chloride was added. The mixture was then heated with agitation in a water bath at boiling temperature. The reaction product was distilled to remove methanol therefrom, dissolved in benzene and the benzene solution was rendered alkaline with caustic soda. The resulting material, di-n-butyl-2-thenylamine, was washed with water and fractionally distilled. Fifty-two and eight-tenths grams of di-n-butyl-2-thenylamine was mixed with 63.3 g. of tetradecyl bromide. To the reaction mixture was added approximately 20 cc. of xylene. The mixture was heated with agitation at approximately 130° C. for approximately 24 hours. Acetone was added to the reaction mixture and the resulting solution was cooled. The material which separated from the solution upon cooling was tetradecyl-di-n-butyl-2-thenyl ammonium bromide. The product was filtered off and dried. The product may be purified according to the procedure described in Example I.

Example XI

A mixture of 86.8 g. (1.47 moles) of methylethylamine and 130.5 g. (0.5 mole) of cetyl chloride in 150 cc. of methanol was prepared and heated in an autoclave according to the procedure described in Example I. The contents of the autoclave were then refluxed for one hour with 42 g. of 50% caustic soda in 100 cc. of water. Thereafter the mixture was cooled and filtered. The filtrate separated into two layers. The butanol layer was isolated, washed and distilled to recover cetyl-methyl-ethyl-amine. To a solution of 29.7 g. (0.1 mole) of cetyl-methyl-ethyl-amine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated from the solution upon cooling was filtered off and dried. A good yield of cetyl-methyl-ethyl-2-thenyl ammonium chloride was obtained. The product may be purified according to the procedure of Example I.

Example XII

A mixture of 178 g. (1.47 moles) of methyl-benzyl-amine and 130.5 (0.5 mole) of cetyl chloride in 150 cc. of butanol was prepared and heated in an autoclave according to the procedure described in Example I. The contents of the autoclave were then refluxed for one hour with 42 g. of 50% caustic soda in 100 cc. of water. Thereafter the mixture was cooled and filtered. The butanol layer was isolated, washed and distilled to recover cetyl-methyl-benzyl-amine. To a solution of 34.5 g. (0.1 mole) of cetyl-methyl-benzyl-amine in 25 cc. of acetone was slowly added 13.3 g. (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated upon cooling the solution was filtered off and dried. A good yield of cetyl-methyl-benzyl-2-thenyl ammonium chloride was obtained. The product may be purified according to the procedure of Example I.

Example XIII

To 86.2 g. (2.77 moles) of monomethylamine in 500 cc. of butanol maintained at a temperature in the range of 10–15° C. were added 132.6 g. (1 mole) of 2-thenyl chloride over a period of 30 minutes. The mixture was agitated at room temperature for 16 hours, was allowed to stand at room temperature for 24 hours and was then heated at 60° C. for one hour. A solution of 84 g. of 50% caustic soda in 125 cc. of water was added to the reaction mixture and the mixture was then refluxed for 15 minutes, cooled and the layers were separated. The butanol-amine layer was washed with water and the caustic soda layer and water washes were extracted with benzene. The benzene extract was added to the butanol solution. The benzene-butanol solution was then fractionally distilled. Yield 42.2 g. (33.2%) of methyl-2-thenylamine, B. P. 81–85° C./18 mm.; and 55.29 g. (49.6%) of methyl-di-(2-thenyl)-amine, B. P. 116–119° C./2 mm. To a solution of 19.9 g. (0.1 mole) of methyl-di-(2-thenyl)-amine in 25 cc. of acetone was slowly added 26.1 g. (0.1 mole) of cetyl chloride under reflux conditions. The solution was refluxed for 8 hours. Following this, 100 cc. of acetone were added, the solution was treated with charcoal, filtered hot and allowed to cool slowly. The material which separated upon cooling the solution was filtered off and dried. A good yield of cetyl-methyl-di-(2-thenyl) ammonium chloride was obtained. The product may be purified according to the procedure of Example I.

Example XIV

To 40 g. (0.314 mole) of methyl-2-thenylamine, prepared according to the procedure described in Example XIII, and maintained at a temperature of 135–140° C. were added 41 g. (0.157 mole) of cetyl chloride. The solution was then heated at a temperature in the range of 140–145° C. for 18 hours. A solution of 13.2 g. of 50% caustic soda in 20 cc. of water was added and the reaction product was refluxed for 20 minutes. The layers were separated. The amine layer was washed with water and the caustic soda and water washes were extracted with benzene. The benzene extract was added to the amine layer. The benzene-amine solution was distilled. The products recovered from the distillation were 20.4 g. of methyl-2-thenylamine, B. P. 81–85° C./18 mm.; 35.7 g. (65%) of cetyl-methyl-2-thenyl-amine, B. P. 192–200° C./2 mm. and 14.6 g. of an intermediate fraction boiling chiefly at 130–140° C./2 mm. To a solution of 35.1 g. (0.1 mole) of cetyl-methyl-2-thenylamine in 25 cc. of acetone was slowly added 13.3 g (0.1 mole) of 2-thenyl chloride under reflux conditions. The solution was refluxed for 8 hours. Following this 100 cc. of acetone were added, the solution was treated with charcoal, filtered hot and allowed to cool slowly. The material which separated upon cooling the solution was filtered off and dried. A good yield of cetyl-methyl-di-(2-thenyl) ammonium chloride was obtained. The product may be purified according to the procedure of Example I.

Example XV

To 193.2 g. (0.8 mole) of cetylamine maintained at a temperature in the range of 95–100° C. were slowly added 26.5 g. (0.2 mole) of 2-thenyl chloride. The reaction mixture was heated at a temperature in the range of 95–100° C. for 5 hours and was then allowed to stand overnight. To the reaction mixture were added 200 cc. of benzene and the temperature of the mixture was maintained in the range of 75–80° C., during which time 15 g. of 84% sodium methylate were added. The reaction product was allowed to stand overnight. The sodium chloride which formed in the mixture was filtered off and washed with benzene. The benzene wash was added to the filtered reaction mixture. The benzene solution was fractionally distilled and the material boiling in the range of 190–250° C./1 mm. was isolated. This fraction was redistilled to obtain 50.6 g. of cetyl-2-thenylamine, boiling point 195–210° C./1 mm. To a solution of 33.7 g. (0.1 mole) of cetyl-2-thenylamine in 25 cc. of acetone was slowly added 12.6 g. (0.1 mole) of dimethyl sulfate under reflux conditions. The solution was refluxed for 8 hours. Thereafter the solution was treated with excess sodium methylate, filtered and fractionally distilled to recover cetyl-methyl-2-thenylamine. This material was then reacted with 2-thenyl chloride according to the procedure described in Example XIV to obtain cetyl-methyl-di-(2-thenyl) ammonium chloride.

Example XVI

A one mole portion (average molecular weight 205) of a technical mixture of monohydric aliphatic alcohols containing from 8 to 18 carbon atoms was converted to the corresponding alkyl chlorides. Of the quantity of mixed alkyl chlorides thus obtained a 0.5 mole portion, calculated on the basis of the average chlorine content of the mixture, was mixed with a 1.5 mole portion of dimethylamine in 150 cc. of butanol. The mixture was heated in an autoclave equipped with an agitator according to the procedure described in Example I. The contents of the autoclave were then refluxed for one hour with 42 g. of 50% casutic soda in 100 cc. of water. Thereafter the mixture was cooled and filtered. The filtrate separated into two layers. The layers were separated and washed and the butanol layer was distilled to recover the mixture of $C_8$–$C_{18}$ alkyl dimethylamines formed in the reaction. To a solution of 0.1 mole of the mixture of $C_8$–$C_{18}$ alkyla dimethylamines in 25 cc. of acetone was slowly added 0.1 mole of 2-thenyl chloride under reflux conditions. The solution was refluxed for 8 hours. Following this 100 cc. were added, the solution was treated with charcoal, filtered hot and allowed to cool slowly. The material which separated from the solution upon cooling was filtered off and dried. A good yield of C8–C18 alkyl-dimethyl-2-thenyl ammonium chlorides were obtained. The product may be purified according to the procedure of Example I.

*Example XVII*

A mixture of 35 g. of dimethyl-2-thenyl amine, prepared according to the procedure of Example II, and 77 g. of cetyl iodide was prepared. To the mixture was added approximately 25 cc. of xylene. The mixture was heated with agitation at 125–130° C. for 24 hours. Thereafter the reaction mixture was processed according to the procedure described in Example II. The product recovered from the reaction mixture was cetyl-dimethyl-2-thenyl ammonium iodide.

*Example XVIII*

A mixture of 35 g. of dimethyl-2-thenyl amine, prepared according to the procedure described in Example II, and 53 g. of cetyl fluoride was prepared. To the mixture was added approximately 30 cc. of xylene. The mixture was then heated with agitation in an autoclave at a temperature above 150° C. for a period of approximately 5 hours. The contents of the autoclave were then processed according to the procedure described in Example II. The product recovered from the reaction mixture was cetyl-dimethyl-2-thenyl ammonium fluoride.

I have found that the sequence of operations described in Example I in which 2-thenyl chloride is reacted with cetyl-dimethylamine gives the best yields and is the preferred procedure. The sequence of operations described in Example II in which 2-thenyl chloride is first reacted with dimethylamine and the resulting material is then reacted with cetyl chloride or cetyl bromide results in somewhat lower yields. I have also found it possible to prepare cetyl-dimethyl-2-thenyl ammonium chloride by the procedure of Example I with the modification that the solvent is omitted during the reaction. In this instance, however, the yields are somewhat lower than those which are obtained by the method of Example I in which acetone is employed as a solvent. Other suitable solvents may be employed in place of acetone during the reaction. However, it is necessary to select a solvent which will not react with 2-thenyl chloride under the conditions of the aforedescribed reaction.

I claim:

1. A compound having the formula

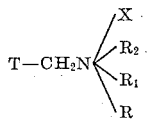

in which T is a radical having thiophene as a nucleus, R is a straight chain alkyl radical containing 8 to 18 carbon atoms, R1 is a radical selected from the group consisting of alkyl radicals containing 1 to 7 carbon atoms, cycloalkyl-methyl radicals, aryl-methyl radicals and thienyl-methyl radicals, R2 is an alkyl radical containing 1 to 7 carbon atoms, and X is a halogen.

2. Cetyl-dimethyl-2-thenyl ammonium chloride.

3. Decyl-dimethyl-2-thenyl ammonium chloride.

4. Cetyl-methyl-di-(2-thenyl) ammonium chloride.

5. A process for preparing compounds of the formula type

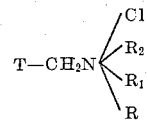

in which T is a radical having thiophene as a nucleus, R is a straight chain alkyl radical containing 8 to 18 carbon atoms, R1 is a radical selected from the group consisting of alkyl radicals containing 1 to 7 carbon atoms, cycloalkyl-methyl radicals, aryl-methyl radicals and thienyl-methyl radicals and R2 is an alkyl radical containing 1 to 7 carbon atoms, comprising condensing an amine having a formula of the type $$RN\begin{matrix}R_2\\R_1\end{matrix}$$

in which R is a straight chain alkyl radical containing 8 to 18 carbon atoms, R1 is a radical selected from the group consisting of alkyl radicals containing 1 to 7 carbon atoms, cycloalkyl-methyl radicals, aryl-methyl radicals and thienyl-methyl radicals and R2 is an alkyl radical containing 1 to 7 carbon atoms, with 2-thenyl chloride, and subsequently recovering from the reaction mixture a compound having a formula of the type hereinbefore described.

6. A process for preparing compounds of the formula type

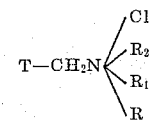

in which T is a radical having thiophene as a nucleus, R is a straight chain alkyl radical containing 8 to 18 carbon atoms, R1 is a radical selected from the group consisting of alkyl radicals containing 1 to 7 carbon atoms, cycloalkyl-methyl radicals, aryl-methyl radicals and thienyl-methyl radicals and R2 is an alkyl radical containing 1 to 7 carbon atoms, comprising condensing an amine having a formula of the type

in which R1 is a radical selected from the group consisting of alkyl radicals containing 1 to 7 carbon atoms, cycloalkyl-methyl radicals, aryl-methyl radicals and thienyl-methyl radicals and R2 is an alkyl radical containing 1 to 7 carbon atoms, with a straight chain alkyl halide containing 8 to 18 carbon atoms, reacting the resulting tertiary amine with 2-thenyl chloride, and subsequently recovering from the reaction mixture a compound having a formula of the type hereinbefore described.

7. A germicidal composition comprising a mixture of compounds each of which has the formula

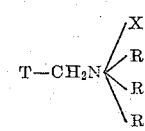

in which T is a radical having thiophene as a nucleus, R is a straight chain alkyl radical containing 8 to 18 carbon atoms, R1 is a radical selected from the group consisting of alkyl radicals containing 1 to 7 carbon atoms, cycloalkyl-methyl radicals, aryl-methyl radicals and thienyl-methyl radicals, $R_2$ is an alkyl radical containing 1 to 7 carbon atoms, and X is a halogen, said composition containing a series of components in which R of the above formula is represented in respective components of the mixture by alkyl radicals having from 8 to 18 carbon atoms, said alkyl radicals being derived from the halides of a technical mixture of aliphatic monohydric alcohols containing 8 to 18 carbon atoms, said technical mixture of alcohols having an average molecular weight of 205.

8. A process of preparing cetyl-dimethyl-2-thenyl ammonium chloride comprising condensing cetyl-dimethylamine with 2-thenyl chloride, and subsequently recovering cetyl-dimethyl-2-thenyl ammonium chloride from the reaction mixture.

9. A process of preparing cetyl-dimethyl-2-thenyl ammonium chloride comprising reacting in equimolecular proportions cetyl-dimethylamine and 2-thenyl chloride in acetone solution under reflux conditions, and subsequently recovering cetyl-dimethyl-2-thenyl ammonium chloride from the reaction mixture.

LUCAS P. KYRIDES.

REFERENCES CITED

The following references are of record in the file of this patent:

UNITED STATES PATENTS

| Number | Name | Date |
|---|---|---|
| 2,075,958 | Piggott | Apr. 6, 1937 |
| 2,108,765 | Domagk | Feb. 15, 1938 |
| 2,185,220 | Nabenhauer | Jan. 2, 1940 |
| 2,295,504 | Shelton | Sept. 8, 1942 |

OTHER REFERENCES

Seemann: Canadian Journal of Research, Dec. 1941, p. 291.

Blicke, J. Am. Chem. Soc., March 1942, p. 477.

Science, vol. 91, June 28, 1940, pp. 624, 625.